(12) United States Patent
Marciniak (10) Patent No.: US 10,717,405 B2
(45) Date of Patent: Jul. 21, 2020

(54) AIRBAG ARRANGEMENT FOR PROTECTION IN A FAR-SIDE VEHICULAR CRASH

(71) Applicant: Rivian IP Holdings, LLC, Plymouth, MI (US)

(72) Inventor: Anthony Andrew Marciniak, Birmingham, MI (US)

(73) Assignee: Rivian IP Holdings, LLC, Plymouth, MI (US)

(*) Notice: Subject to any disclaimer, the term of this patent is extended or adjusted under 35 U.S.C. 154(b) by 116 days.

(21) Appl. No.: 15/925,114

(22) Filed: Mar. 19, 2018

(65) Prior Publication Data

US 2019/0283703 A1  Sep. 19, 2019

(51) Int. Cl.
*B60R 21/231* (2011.01)
*B60R 21/00* (2006.01)

(52) U.S. Cl.
CPC ..... *B60R 21/23138* (2013.01); *B60R 2021/0006* (2013.01); *B60R 2021/23107* (2013.01); *B60R 2021/23146* (2013.01); *B60R 2021/23161* (2013.01)

(58) Field of Classification Search
CPC .... B60R 21/23138; B60R 2021/23107; B60R 2021/23161; B60R 2021/0006; B60R 2021/23146
See application file for complete search history.

(56) References Cited

U.S. PATENT DOCUMENTS

| | | | |
|---|---|---|---|
| 5,499,840 A * | 3/1996 | Nakano | B60N 2/0705 280/730.1 |
| 7,338,069 B2 | 3/2008 | Breed | |
| 7,726,684 B2 | 6/2010 | Breed | |
| 8,414,018 B2 | 4/2013 | Choi et al. | |
| 8,684,408 B2 | 4/2014 | Thomas et al. | |
| 9,004,526 B2 | 4/2015 | Fukawatase et al. | |
| 2011/0148080 A1* | 6/2011 | Marable | B60R 21/233 280/730.2 |
| 2015/0158453 A1* | 6/2015 | Fujiwara | B60R 21/207 280/730.2 |
| 2015/0197209 A1* | 7/2015 | Fujiwara | B60R 21/231 280/730.1 |
| 2015/0274111 A1* | 10/2015 | Ishida | B60R 21/207 280/730.2 |
| 2016/0101759 A1 | 4/2016 | Fujiwara | |
| 2016/0129876 A1* | 5/2016 | Fujiwara | B60R 21/233 280/729 |
| 2016/0229369 A1* | 8/2016 | Thomas | B60R 21/207 |
| 2016/0297393 A1* | 10/2016 | Fukawatase | B60R 21/231 |

(Continued)

FOREIGN PATENT DOCUMENTS

| CN | 106184103 | 12/2016 |
|---|---|---|
| JP | H07 267037 | 10/1995 |

OTHER PUBLICATIONS

International Search Report and Written Opinion in Application No. PCT/US2019/020955, dated May 6, 2019 (14 Pages).

*Primary Examiner* — Drew J Brown
(74) *Attorney, Agent, or Firm* — Haley Guiliano LLP (57) ABSTRACT

An arrangement of two airbags located in a respective seatback for two adjacent seats. The two airbags are configured to deploy in a center area between the two adjacent seats and provide support and protection for an occupant in a vehicle involved in a far-side crash.

20 Claims, 9 Drawing Sheets

(56) References Cited

U.S. PATENT DOCUMENTS

| | | | |
|---|---|---|---|
| 2018/0370472 A1* | 12/2018 | Belwafa | B60R 21/0136 |
| 2019/0023213 A1* | 1/2019 | Faruque | B60R 21/231 |
| 2019/0135220 A1* | 5/2019 | Rupp | B60R 21/237 |

* cited by examiner

AIRBAG ARRANGEMENT FOR PROTECTION IN A FAR-SIDE VEHICULAR CRASH

INTRODUCTION

Airbags are used in vehicles to protect vehicle occupants in a crash. Typically, the airbags are placed in various locations around the vehicle, for example, in a steering wheel or in front of a front seat passenger. Other airbags may be placed in other locations in the vehicle, such as side curtain airbags that are placed along a vehicle ceiling and drop down along a window or door. Airbags are activated following a crash when a sensor in the vehicle detects a change in a rate of speed of the vehicle, an impact of the vehicle, or a combination thereof. In some vehicles, the sensor is capable of detecting a crash type and location, and will initiate deployment of suitable airbags to protect occupants in the vehicle. In some vehicles, for example, those with captain seats or having a space between two adjacent seats, there may be a gap between the seats where there is space for excessive movement of a person in the vehicle in the event of a crash. Providing additional support and protection in the center space may improve outcomes for passengers involved in a crash, particularly, a far-side crash.

SUMMARY OF THE DISCLOSURE

An arrangement of a pair of airbags is described herein to improve safety for occupants of a vehicle involved in a far-side crash. A pair of airbags may be deployed to fill an interior space in a vehicle to support persons in a vehicle that is involved in a side crash, particularly, a person facing a far-side crash. In general, an airbag inflating into an open space, such as an empty interior space, may have supportive limitations because the airbag may not be braced by a physical structure and can lack a reactive surface. The pairs of airbags described herein may be deployed in a number of shapes and arrangements and be used in different vehicle interior designs, such as those having particular pillar designs, instrument panel shapes, seat designs and other configurations, in an interior space between vehicle seats where a single airbag may be insufficient for supporting and protecting a vehicle occupant.

In an example, the airbag arrangement may include a first airbag that is disposed on a right side of a seatback of a first seat in the vehicle and a second airbag that is disposed on a left side of a seatback of a second seat in the vehicle. The two seats are located adjacent to each other for two occupants or persons in a vehicle. For example, the two seats can be a set of front row seats for a driver and a passenger, or a second row of seats for two passengers. The second seat in the vehicle is disposed on the right side of the first seat. The first airbag and the second airbag are configured to deploy at least partially into space between the first seat and the second seat when the vehicle is involved in a far-side crash. The first airbag and the second airbag are configured to act together to support a side of the passenger or driver facing the far-side crash. In some scenarios, the first airbag and the second air bag are configured to act together to support a side of the vehicle occupant on a near side of the crash so that person is contained from the other person facing the far-side crash.

Deployment of the pair of airbags may be initiated by an airbag detonator that is configured to be controlled by an airbag controller that has detected a crash scenario. The airbag controller may receive signals from one or more vehicle crash sensors to determine whether a far-side crash has occurred. When the airbag controller detects that such a crash has occurred, the airbag controller may initiate deployment of airbags in the vehicle. The airbag arrangement of the first airbag and the second airbag are configured to be deployed substantially concurrently.

The vehicle crash sensor may be configured to detect a crash involving the vehicle and initiate activation of the airbag by sending the crash sensor information to an airbag controller which may signal the airbags to deploy. The airbags may be deployed using, for example, a signal sent to an airbag switch, initiator, ignitor, or other starting device used to initiate inflation of the first airbag and the second airbag. When the vehicle crash sensor senses a far-side crash in the vehicle, the vehicle crash sensor is configured to send one or more signals to the airbag controller to initiate deployment of the first airbag and the second airbag.

The airbag arrangement of the first airbag and the second airbag may be configured to provide reciprocal support to each other when the airbag pair are deployed. The reciprocal support may be provided using a wedging effect of the two airbags between the two adjacent seatbacks. The two airbags can be supplied using suitable shapes, and fabrics having suitable friction and stiffness qualities, and a combination thereof to provide the reciprocal support.

The airbag arrangement may comprise a pair of shaped airbags. The airbag shapes may be symmetrical or asymmetrical. In some scenarios, the first airbag and the second airbag are complementary shaped pairs having a nested convex and concave shape, respectively. The nested or complementary shapes may be located at a portion of each airbag that is in contact with the other of the pair of airbags. The nesting of the shapes may allow the airbags to wedge together and limit slipping to provide mutual support between the two airbags.

The airbag arrangement may be adapted to deploy into a space between a first seat and second seat when the first seat and second seat are not aligned in the same fore/aft position. When the first seat is configured to have an adjustable first position and the second seat is configured to have an adjustable second position, and when the first position and the second position are different along at least one axis, such as a fore/aft axis, a vertical axis, a straight/reclined axis, or other positional axis in the vehicle, the first airbag and the second airbag are adapted to deploy such that one side of the first airbag facing a second side of the second airbag are substantially overlapping. Such deployment may substantially fill a space between the first seat and the second seat despite an irregularity in the space due to the different positioning of the first seat and the second seat. In some scenarios, rotation and placement of the airbags in an irregular space may occur by timing deployment of the airbags, and also by wedging each airbag against the other and also the seatbacks.

The airbags in the airbag arrangement may be designed to have certain characteristics that allow the pair of airbags to wedge together and to provide support for vehicle occupants. Materials selected for the airbags may be selected so that a first surface of a first airbag has a friction coefficient selected to provide a frictional force between the first surface of the first airbag and a second surface of the second airbag that is in contact with the first surface. The first surface and the second surface are in contact when the first airbag and the second airbag are deployed. The frictional force between the airbags helps limit slippage between the airbags and allows the airbags to wedge together and remain in place between the seatbacks. The frictional force is selected to provide support between the airbag pair to protect the vehicle occupant, in particular, the occupant facing a far-side crash. The friction coefficient of material for the first surface may differ from a friction coefficient of material for the first airbag outside of the first surface. Similarly, the friction coefficient of material for the second surface may differ from a friction coefficient of material for the second airbag outside of the second surface.

In another feature of the airbag arrangement, the airbags may have different material rigidity for different portions of the airbag. For example, an upper portion of the airbag that may come into contact with a person's head upon deployment may be constructed of a material that is a softer or less stiff that material selected for construction of a lower portion of the airbag that may come into contact with a person's torso. In addition, a surface of the airbag that may come into contact with the other airbag may be constructed of a stiffer material so that the contact surface side of the airbag provides a rigid support for the other of the pair of airbags. Inflation of portions of the airbags may also differ. An upper portion of the airbag may have a lower inflation pressure to protect a person's head with a softer airbag portion, whereas a lower portion of the airbag may have a greater inflation pressure to support a person's torso. The airbag's material stiffness and rigidity, inflation pressures, material frictional qualities may be used together to improve reaction forces between the airbag pair and to protect the vehicle occupants.

In some embodiments, a method of arranging a pair of airbags for protection of a person in a vehicle involved in a far-side crash may include detecting, with a sensor in the vehicle, that a far-side crash has occurred. There may be a plurality of sensors in the vehicle that sense movement and deceleration of the vehicle. The sensor data may be analyzed by an airbag controller to determine whether a far-side crash has occurred. If a far-side crash is determined to have occurred, the airbag controller may initiate by a signal, deployment of a first airbag positioned in a seatback of a first seat and a second airbag positioned in a seatback of a second seat. The first airbag and the second airbag may be configured to deploy in a space between the first seat and the second seat and be configured to act together to support a side of the person facing the far-side crash.

In some scenarios, the first airbag and the second airbag may be wedged together between the seatbacks upon deployment using a frictional force of a first surface of the first airbag and a second surface of the second airbag that is in contact with the first surface. The wedging of the first airbag and the second airbag may provide reciprocal support between the first airbag and the second airbag. The frictional force may be selected to control or limit slippage between the airbag pair.

The first airbag and the second airbag may be wedged upon deployment using a complementary shape arrangement comprising a convex shape of the first airbag at a portion of the first airbag that is in contact with a concave shape of a second portion of the second airbag. The complementary shapes may be selected to control slippage between the airbag pair.

The first airbag may include different features for protecting different parts of the person. For example, an upper portion for supporting a head of a person in the vehicle in a far-side crash may be selected to have qualities suitable for head injury protection. The first airbag may have an upper portion that is configured to inflate to a soft pressure, and the upper portion of the first airbag may have a surface material selected for a softness.

The first airbag may also include a lower portion designed for supporting a torso of the person. The lower portion of the first airbag may be configured to inflate to a firm pressure greater than the inflation pressure of the upper portion of the first airbag, and the lower portion of the first airbag having a surface material selected for stiffness.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

An airbag arrangement is described herein for protecting occupants in a vehicle crash. In particular, the airbag arrangement is configured to provide improved protection for vehicle occupants involved in a far-side crash. A far-side crash is a type of crash that impacts a side of a vehicle. A far-side crash is relative to an occupant of a car. When a side crash occurs, the person on the near side of the crash is referred to as having a near-side crash impact. A person on the far side of the crash has a far-side crash impact. Each occupant in the vehicle may experience the same impact in a different manner. A person experiencing a near-side crash impact may benefit from different protection than a person experiencing a far-side crash impact. For example, when a side crash occurs, the person on the opposite side of the crash (the far-side impact) may move in a direction towards the other person (near-side crash impact) and may cause injury to the other person experiencing the near-side crash impact. To protect vehicle occupants in a far-side crash scenario, vehicle safety sensors may activate a lock on seatbelts to help hold each person in position. To further protect vehicle occupants, an airbag arrangement may be deployed between the seats to contain the far-side person's movement between seats and protect the near-side occupant from the far-side occupant.

In an example, an airbag arrangement may include two airbags that are located in a seatback for a driver and passenger. Such airbag arrangement can also be located in a seatback of a second row of passenger seats (or in a third row of seats, etc.). The airbags may be coupled to a sensor which can detect a crash scenario and cause the airbags to deploy in a space between the two seats. The airbags may be configured to fill the space between the two seats as a pair and provide side support for the other respective airbag to protect a person experiencing a far-side crash impact. The pair of airbags may help contain lateral movement of the vehicle occupants and also protect a person experiencing a near-side crash.

The airbags may be constructed of a woven material and can contain for example, plastic or synthetic weave materials that are selected for stiffness. Kevlar, plastic, metallic or other stiff fabrics may also be used. The stiffness of the fabric for the airbag is useful for protecting against lateral movement of the upper torso, for example. Materials for the airbags may be different for different portions of the airbags. For example, an upper portion of an airbag which may come into contact with a head of a person, may be less stiff than a lower portion of the airbag which may come into contact with a person's torso or shoulders. In addition, an upper portion of the airbag may be shaped larger than a lower portion of the airbag to take into account the smaller size of a person's head relative to the passenger's torso. Airbag material may be composed of different types of materials woven together in warp and weft directions to provide a suitable rigidity.

An external material layer of the airbag may be selected to have certain friction qualities which can cause a stickiness to the material of the external layer of the airbag which can help an airbag pair stick together, limiting slippage between the two airbags and providing an additional component of support between the airbag pair. In some scenarios, a higher friction coefficient material layer may be placed on each of the airbags in the pair on a side that faces the other airbag in the pair and which is contact with a surface of the other airbag. The friction coefficient of fabric for other areas of the airbag that are not in contact with the other airbag may be different and less.

The pair of airbags may be shaped in a manner suitable for filling a space between two seats in a vehicle. However, the airbag features described herein may be employed in other locations in a vehicle where a single airbag may provide insufficient support, or where an open space exists. For example, vehicles having various instrument panels, seat designs and arrangements and pillar designs may be suitable for using an arrangement of airbags as described herein.

In some examples, the pair of airbags may be symmetrical and similarly shaped. In another example, the pair of airbags may be asymmetrical. The pair of airbags may be shaped to provide a nesting capability which can aid the pair of airbags in forming a reciprocally supporting pair of airbags. For example, the pair of airbags may be constructed to deploy in convex and concave shapes so that one can nest in the other so that they can wedge together and not slip apart. In one example, the portions of the airbags that are designed to be in contact with the other of the airbags may be shaped with nesting features. In another example, one airbag may be doughnut shaped and the other airbag may be more spherical. Other nesting or mating shapes could also be used for the pair. The nesting or mating shapes may be designed to nest even when the seatbacks for the seats are in different positions along the interior of the vehicle. The shape of the airbags alone, or in combination with the tactile qualities of the airbag external surface may allow the airbags to fill any space between the seats, which may vary according to a seat position, and in some scenarios, for the airbags to connect in a manner that allows the airbags to function as part of a larger unit.

When a seat in a car is moved forward or backward by a person, for example, to provide more or less leg room, the space between two seats in a row may change in size. When an airbag located in a seatback deploys into the space between the seats, the airbag effect can differ depending on the size of the space. In some examples, a vehicle sensor may detect a seat position and alter an airbag detonation to account for the different seat positioning. In another example, an airbag pair may be designed to account for the different seat positioning so that it can be deployed into the space in a protective manner.

Figure 1:
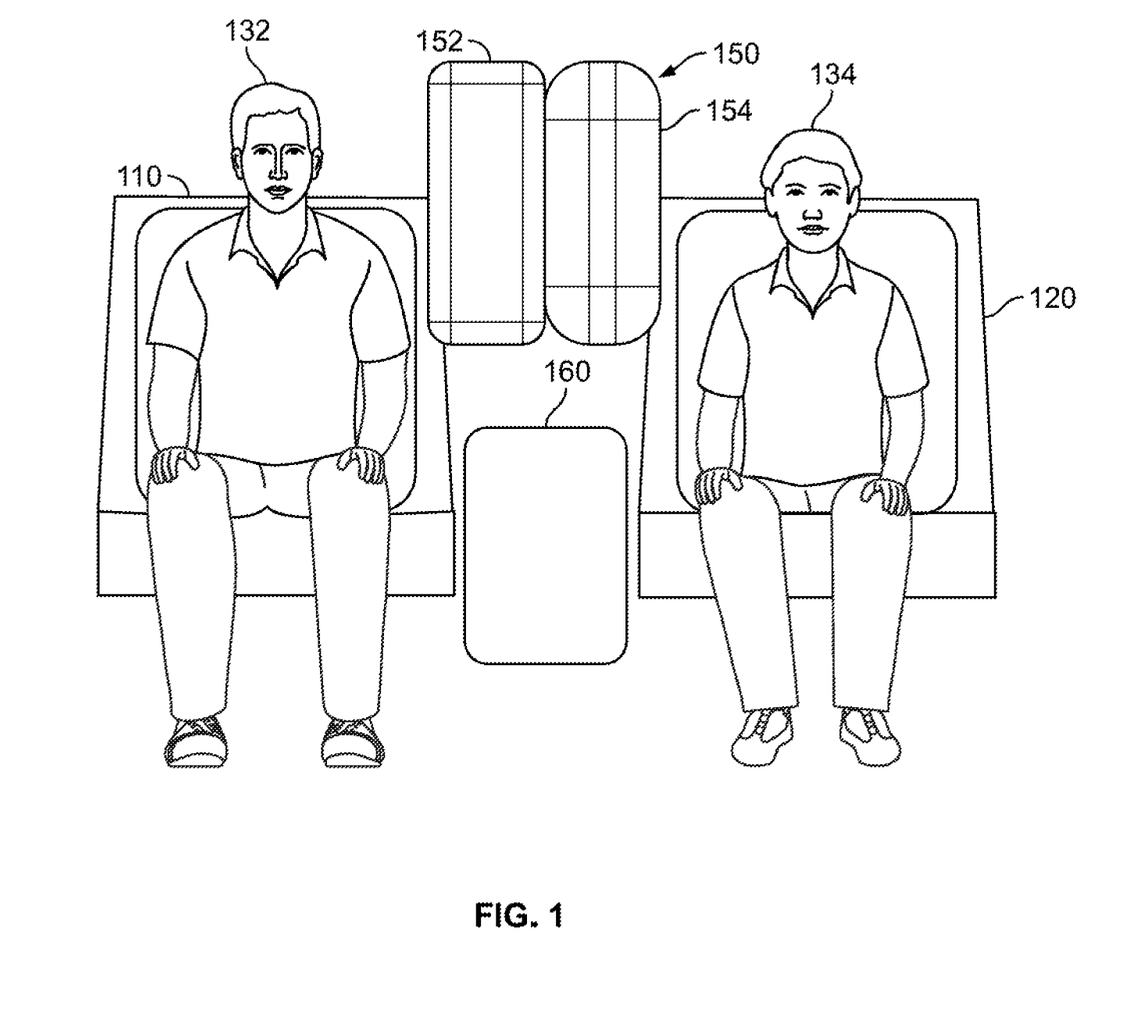
FIG. 1 shows a front view of a pair of airbags deployed between two seats in a vehicle in accordance with some illustrative embodiments of the disclosure.

FIG. 1 depicts an exemplary front view of a vehicle interior according to an illustrative embodiment of the disclosure. The vehicle interior and airbag configurations depicted in FIG. 1 have been simplified and are illustrative of embodiments of the disclosure. Other details, shapes and arrangements of the vehicle interior and airbag may also be used with the features described herein. As shown, the vehicle interior includes a row of seats with a first seat 110 and a second seat 120. The row of seats may be a front row of a vehicle and the first seat 110 may be a passenger seat for a passenger 132 and the second seat 120 may be a driver seat for a driver 134. The row of seats could also be a second or other row in a vehicle having captain seats or otherwise configured to have a space between two seats. A pair of airbags 150 including a first airbag 152 and a second airbag 154 may be deployed in the event of a far-side crash to fill a space between the seats 110 and 120. Such space may include a console 160. As shown in FIG. 1, the airbag pair 150 may be deployed to fill a space between passenger 132 and driver 134 to protect a vehicle occupant from a far-side crash, i.e., a crash into a side of the vehicle occurring on a far-side of the occupant. The airbag pair 150 are configured to deploy substantially concurrently and together so that each airbag in the pair reciprocally supports the other airbag to provide support against lateral movement of passenger 132 or driver 134.

As shown in FIG. 1, airbag pair 150 is designed with asymmetrical shapes that are complementary and can nest together. For example, airbag 154 may be a rounded convex shape that can nest in a concave shaped airbag 152. In some examples, the nesting surface of the airbag may have an external material layer that is selected to have a coefficient of friction that causes a frictional force to be exerted between airbags 152 and 154. The frictional force may cause airbags 152 and 154 to adhere in a manner which can allow each of airbags 152 and 154 to provide reciprocal support to the other in the pair of airbags 150. Such support allows the pair of airbags to improve containment of lateral motion of an occupant 132 or 134 in a crash scenario. Airbags 152 and 154 can also wedge between seats 110 and 120 to protect the occupants 110 and 120.

Airbags 152 and 154 may be constructed having different weaves of materials throughout portions of the airbags. For example, an upper portion of airbags 152 and 154 may be designed to have a softer weave fabric so that it is soft when in contact with a head of an occupant. A lower portion of airbags 152 and 154 may be designed to have a stiffer weave fabric so that it is firm when in contact with a shoulder or torso of an occupant (e.g., occupant 132 or 134).

Figure 2:
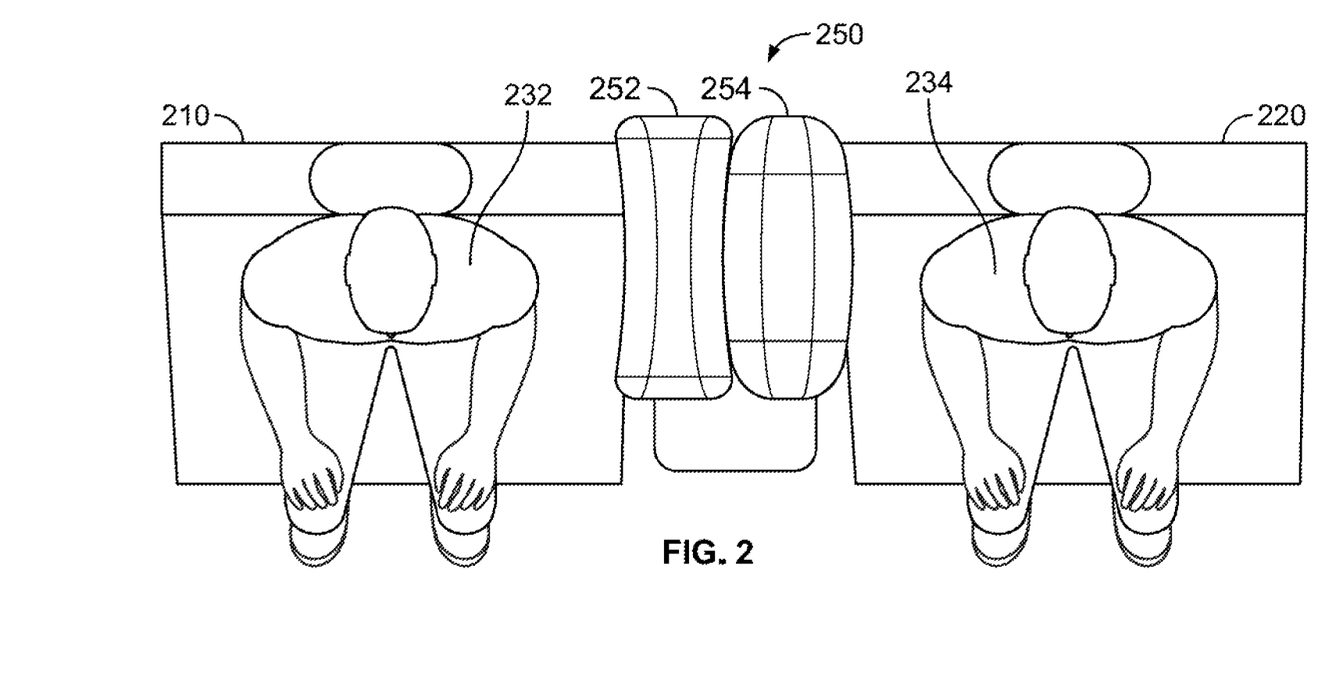
FIG. 2 shows a top view of a pair of airbags deployed between two seats in a vehicle in accordance with some illustrative embodiments of the disclosure.

FIG. 2 depicts an exemplary top down view of a row of seats in a vehicle according to an illustrative embodiment of the disclosure. The vehicle interior and airbag configurations depicted in FIG. 2 have been simplified and are illustrative of embodiments of the disclosure. Other details, shapes and arrangements of the vehicle interior and airbag may also be used with the features described herein. As shown, a first seat 210 in the row of seats and a second seat 220 in the row of seats for a vehicle occupant 232 and 234, respectively, has a gap between the seats. An airbag pair 250 may be configured to deploy between seats 210 and 220 in a far-side crash to create a buffer between occupants 232 and 234 and limit lateral motion of the occupants. Although airbag pair 250 appears to be a single item, it is a pair of airbags that are shaped to nest so that the pair functions as a single unit supported by each airbag in the pair.

Figure 3:
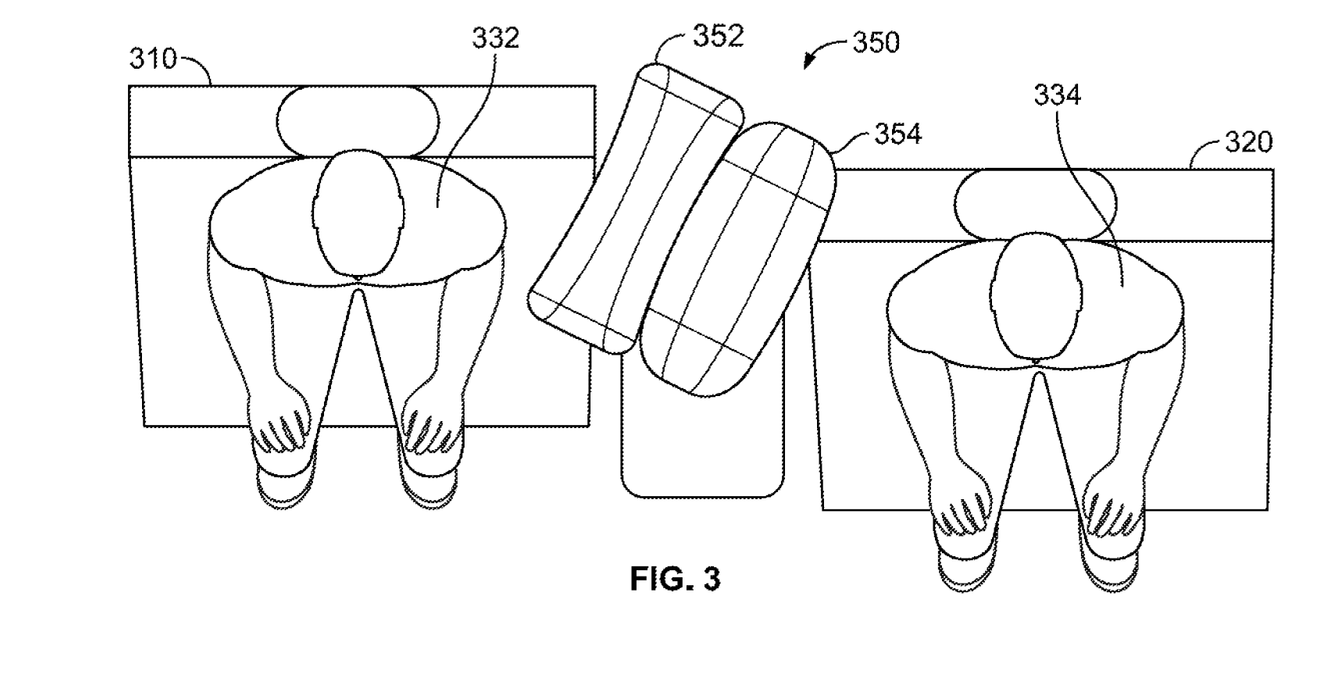
FIG. 3 shows another top view of a pair of airbags deployed between two seats that are positioned in different alignments in a vehicle in accordance with some illustrative embodiments of the disclosure.

FIG. 3 depicts another exemplary top down view of a row of seats in a vehicle according to an illustrative embodiment of the disclosure. The vehicle interior and airbag configurations depicted in FIG. 3 have been simplified and are illustrative of embodiments of the disclosure. Other details, shapes and arrangements of the vehicle interior and airbag may also be used with the features described herein. As shown in FIG. 3, seat 310 and seat 320, for occupants 332 and 334, respectively, are aligned in different positions along a fore/aft axis in a vehicle. For example, a driver 334 may have relatively short legs, and so the driver 334 may move seat 320 forward. Passenger 332 may have longer legs or may wish to stretch out and may move seat 310 to a more rearward position. When seats 310 and 320 are located at a different axis along the vehicle, the space between seats 310 and 320 may be a different shape and need a different airbag arrangement to protect occupants 332 and 334 in a side crash. As shown, a pair of airbags 350 comprising a first airbag 352 and a second airbag 354 are deployed to fill the space between seats 310 and 320 when the seats are not aligned. Compare the orientation of airbags 350 and airbags 250 (of FIG. 2 where seats 210 and 220 are aligned) and notice the turned orientation of airbags 350. Such orientation of airbags 350 is designed to maximize filling of the space between seats 310 and 320, while providing support between the airbag pair 350, and protection of occupants 332 and 334 from lateral motion in a crash. The orientation of deployment of airbag pair 350 in a scenario where seats 310 and 320 are not aligned along one axis (the fore/aft axis of the vehicle), may be controlled using a vehicle crash sensor and a controller or ignitor for deploying airbag pair 350. For example, one of airbags 352 and 354 may be deployed a fraction of a second prior to the other causing a turned orientation following deployment. Deployment of airbags 352 and 354 may be coordinated by an airbag controller which can analyze data from vehicle sensors, which may be used to detect a vehicle crash, and seat sensors to determine a suitable airbag deployment order, or which airbags to deploy, to protect vehicle occupants experiencing a crash. In another example, the airbags deploying between seats that are out of alignment may rotate as the airbags expand and wedge together and between the seats.

Figure 4:
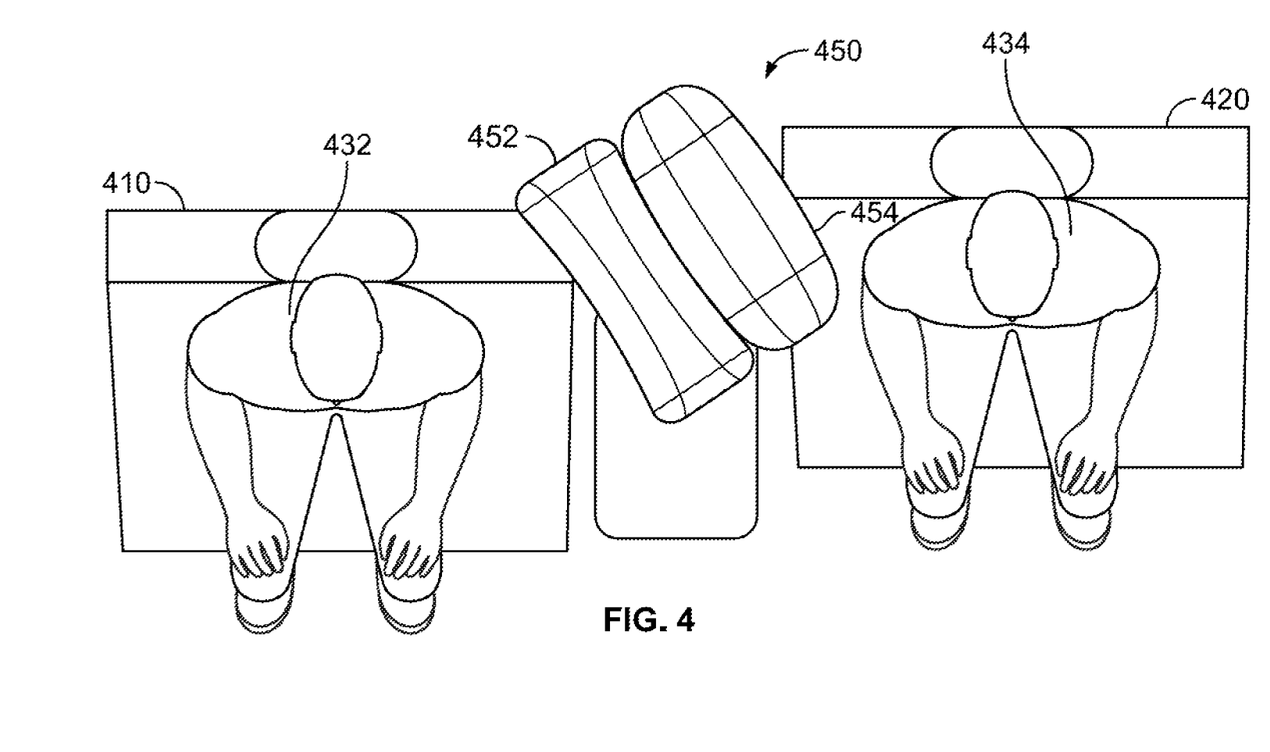
FIG. 4 shows another top view of a pair of airbags deployed between two seats that are positioned in different alignments in a vehicle in accordance with some illustrative embodiments of the disclosure.

FIG. 4 depicts another exemplary top down view of a row of seats in a vehicle according to an illustrative embodiment of the disclosure. The vehicle interior and airbag configurations depicted in FIG. 4 have been simplified and are illustrative of embodiments of the disclosure. Other details, shapes and arrangements of the vehicle interior and airbag may also be used with the features described herein. As shown in FIG. 4, seat 410 and seat 420, for occupants 432 and 434, respectively, are aligned in different positions along a fore/aft axis in a vehicle. For example, a driver 434 may have relatively long legs, and so driver 434 may move seat 420 backward. Passenger 432 may have shorter legs or may wish to accommodate a long-legged passenger behind them and may move seat 410 to a more forward position. When seats 410 and 420 are located at a different axis along the vehicle, the space between seats 410 and 420 may be different than when the seats 410 and 420 are aligned along the axis. When airbag pair 450 deploys in this scenario, airbags 454 and 452 may be deployed in an orientation to fill the space between seats 410 and 420, while containing occupants 432 and 434 and while supporting airbags 452 and 454 reciprocally. Compare the orientation of airbag pairs 450 and 350 (of FIG. 3 where seats 310 and 320 are out of alignment in a different position) and 250 (FIG. 2 where seats 210 and 220 are aligned along a fore/aft axis). Deployment of airbag pair 450 may occur at different time intervals for airbags 454 and 452 as controlled by an airbag controller so that airbag pair 450 can rotate to fill the space between seats 410 and 420. In another example, airbags 454 and 452 rotate as each expands into the space and wedges together and against seats 410 and 420.

Figure 5:
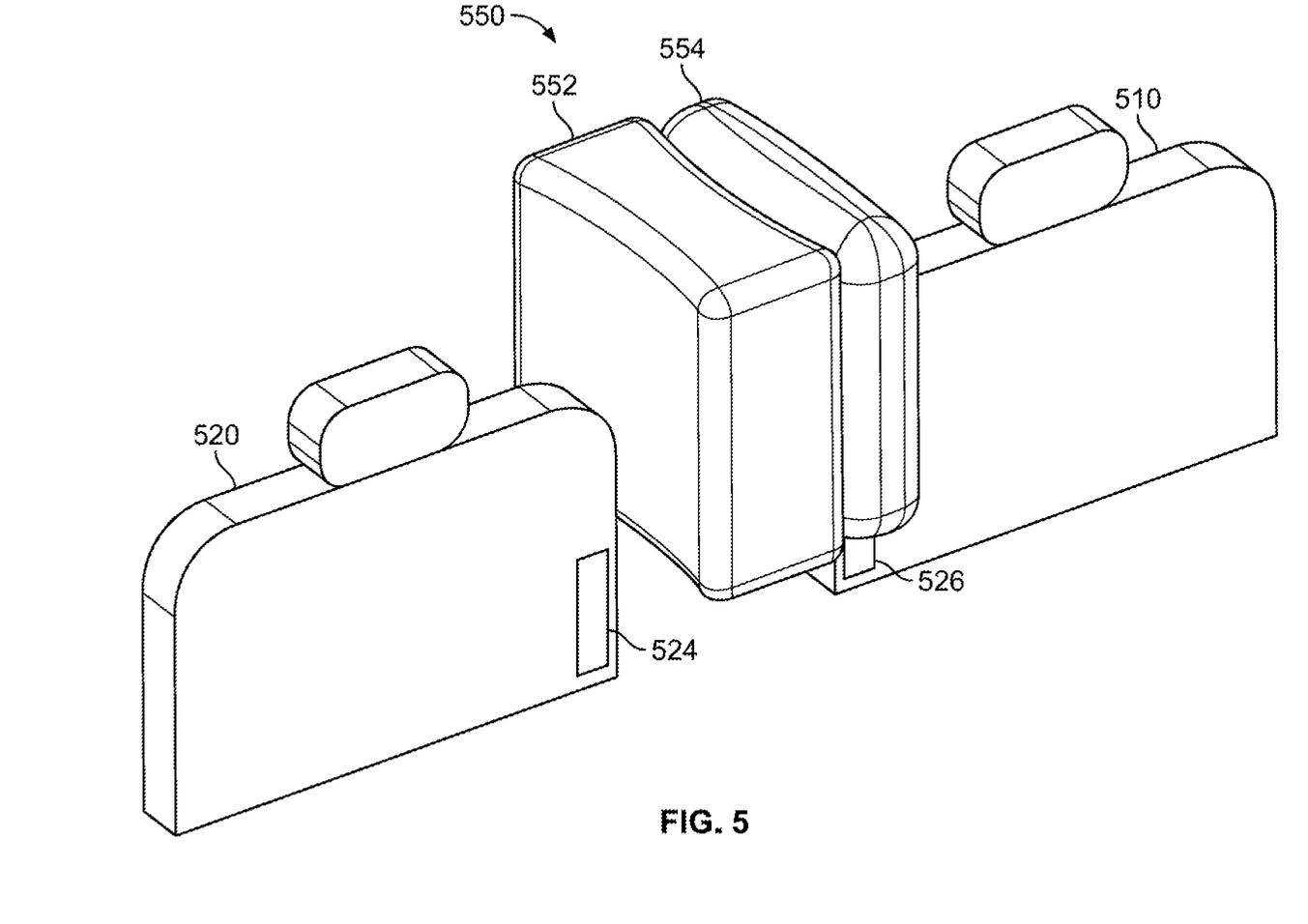
FIG. 5 shows a rear side view of a pair of airbags deployed between two seats in a vehicle in accordance with some illustrative embodiments of the disclosure.

FIG. 5 depicts a rear side view a row of seats in a vehicle according to an illustrative embodiment. The vehicle interior and airbag configurations depicted in FIG. 5 have been simplified and are illustrative of embodiments of the disclosure. Other details, shapes and arrangements of the vehicle interior and airbag may also be used with the features described herein. As shown in FIG. 5, a passenger's seat 510 and a driver's seat 520 may have an airbag pair designed to deploy in a space between seats 510 and 520. Each respective airbag may be located in a seatback of the seat 510 and 520, e.g., in a storage location 526 and 524, respectively. In some embodiments, the location (e.g., location 524 and 526) of the airbag storage point in the seatback is located in the rear of the seatback near an interior side of the seat. In some embodiments, the location of the airbag storage point in the seatback is located on the interior side of the seatback. In some embodiments, the location of the airbag storage point in the seatback is different for each adjacent seatback. Placing the airbag in the seatback can be advantageous, for example, when seats 510 and 520 are not aligned. In contrast, an airbag located in a vehicle ceiling or in a console may have a fixed deployment location which would not account for changes in a position of a vehicle seat, and thus, also a person. As shown in FIG. 5, airbag pair 550 that deploys from seatbacks 524 and 526 comprises two airbags 552 and 554. Airbags 552 and 554 are depicted in illustrative asymmetrical shapes where airbag 552 is concave and airbag 554 is convex. Such shapes are designed to provide nesting between airbags 552 and 554 and support between airbag pair 550.

Figure 6:
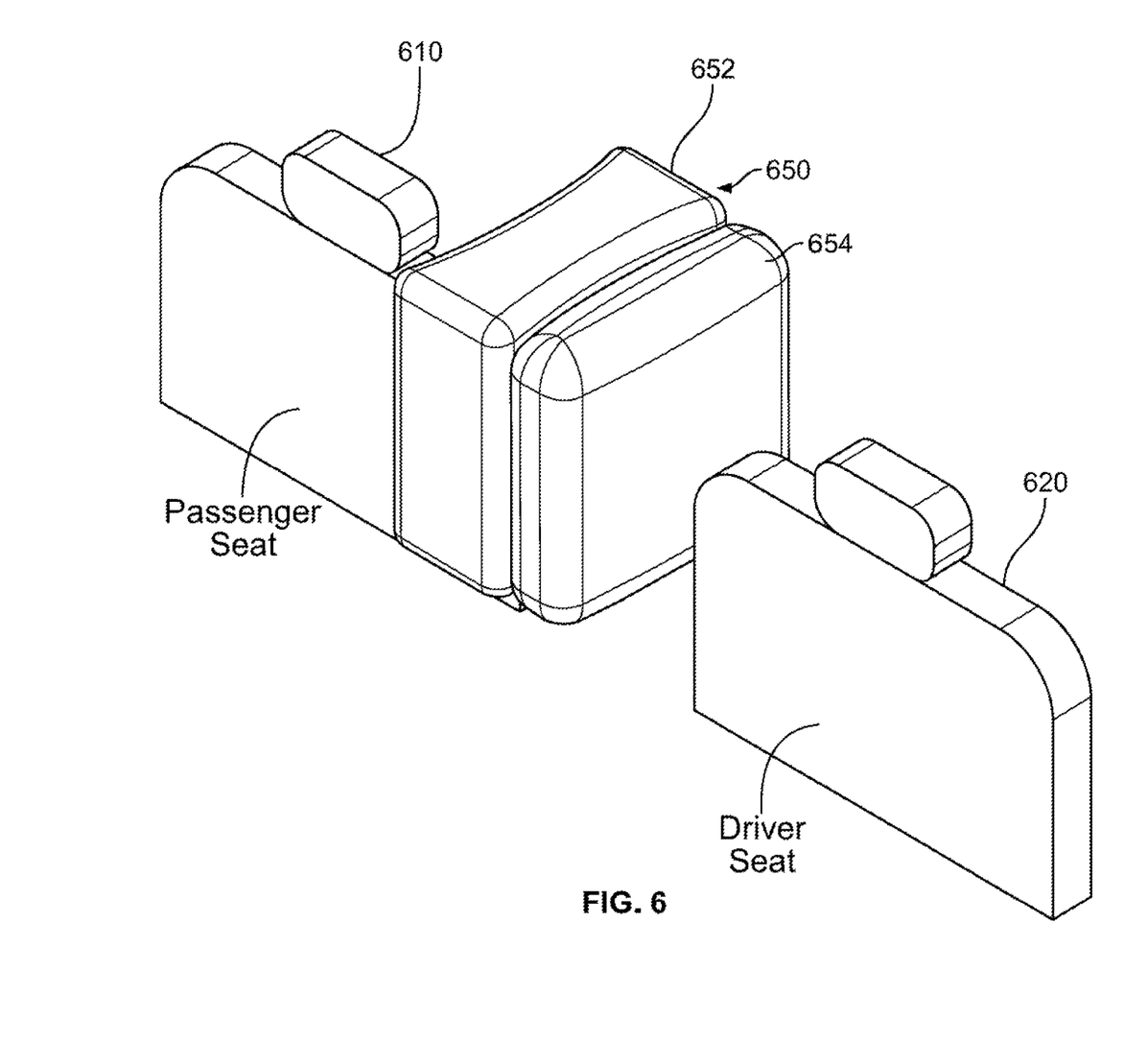
FIG. 6 shows a front side view of a pair of airbags deployed between two seats in a vehicle in accordance with some illustrative embodiments of the disclosure.

FIG. 6 depicts a front side view a row of seats in a vehicle according to an illustrative embodiment. The vehicle interior and airbag configurations depicted in FIG. 6 have been simplified and are illustrative of embodiments of the disclosure. Other details, shapes and arrangements of the vehicle interior and airbag may also be used with the features described herein. As shown in FIG. 6, a passenger seat 610 and a driver seat 620 may be aligned along a fore/aft axis in a vehicle and pair of airbags 650 may be deployed between seats 610 and 620. The airbag pair 650 may include airbag 652 and 654. The airbag pair 650 may be configured to deploy in a far-side crash to fill the space between seats 610 and 620. In FIG. 6, airbag pair 650 may be oriented to maximize an area of a side surface of the airbag pair 650 for contact with an occupant of seat 610 or 620 as well as to maximize contact of between the airbags 652 and 654.

Figure 7:
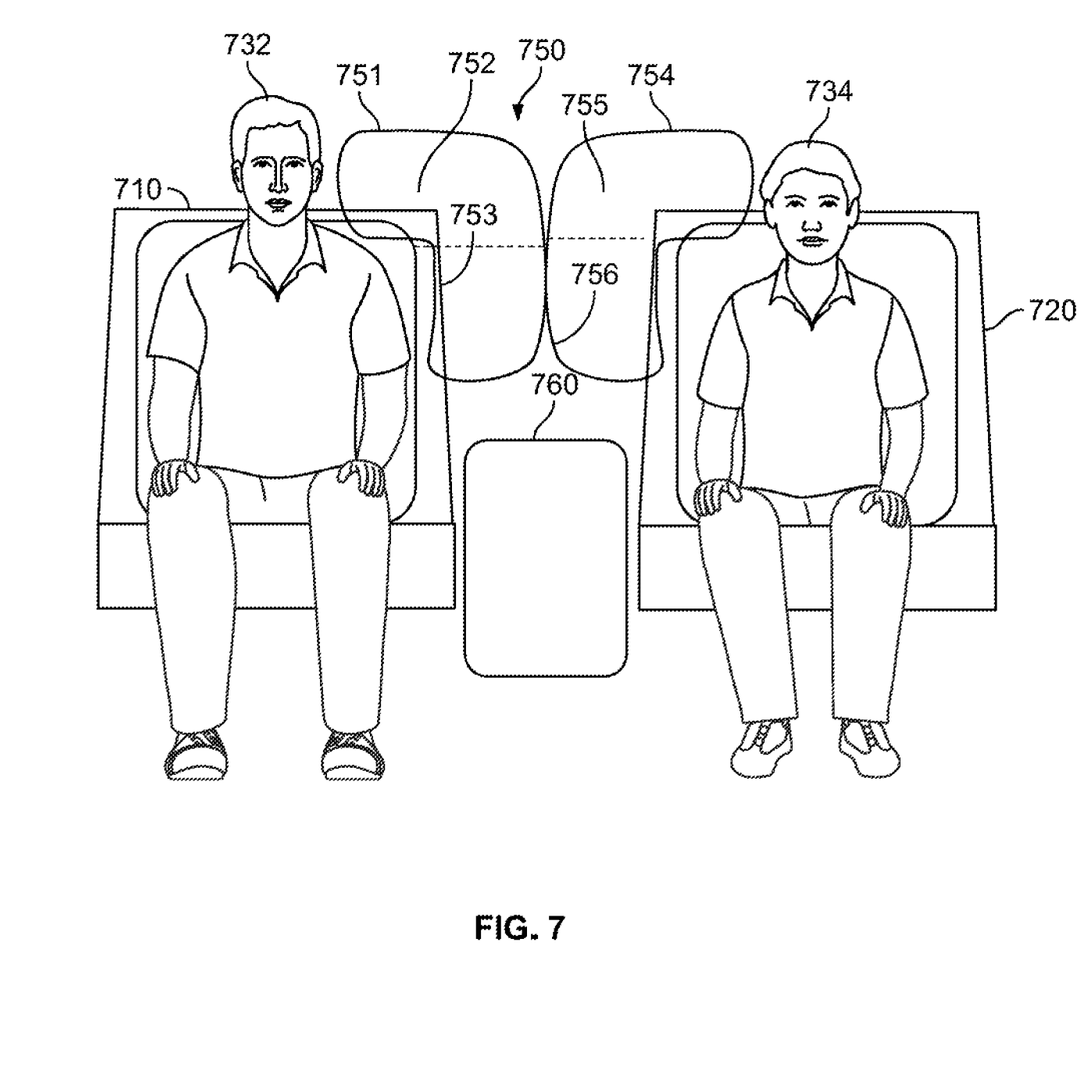
FIG. 7 shows a view of another pair of airbags deployed between two seats in a vehicle in accordance with some illustrative embodiments of the disclosure.

FIG. 7 depicts an exemplary front view of a vehicle interior according to an illustrative embodiment of the disclosure. The vehicle interior and airbag configurations depicted in FIG. 7 have been simplified and are illustrative of embodiments of the disclosure. Other details, shapes and arrangements of the vehicle interior and airbag may also be used with the features described herein. As shown, the vehicle interior includes a row of seats with a first seat 710 and a second seat 720. The row of seats may be a front row of a vehicle and first seat 710 may be a passenger seat for a passenger 732 and second seat 720 may be a driver seat for a driver 734. The row of seats could also be a second row in a vehicle having captain seats or otherwise configured to have a space between the two seats. A pair of airbags 750 including a first airbag 751 and a second airbag 754 may be deployed in the event of a far-side crash to fill a space between seats 710 and 720. Such space may include a console 760. As shown in FIG. 7, airbag pair 750 may be deployed to fill a space between passenger 732 and driver 734 to protect a vehicle occupant from a far-side crash, i.e., a crash into a side of the vehicle occurring on a far-side of the occupant. Airbag pair 750 are configured to deploy substantially concurrently and together so that each airbag of the pair reciprocally supports the other airbag in the pair to provide support against lateral movement of passenger 732 or driver 734. The reciprocal support may be provided using a wedging effect of the pair of airbags between seats 710 and 720. The wedging effect may be supplied by the two airbags have a nesting shape as well as having a material selected to limit slippage of the airbags between each other as they expand in deployment. The wedging may also occur between airbag pair 750 and seats 710 and 720. The wedging effect may be increased, of example, by using a suitable fabric on the side of the seat that comes into contact with airbag pair 750 or on the portions of the airbags that comes into contact with the seat.

Airbag 751 may comprise an upper portion 752 and a lower portion 753. Airbag 754 may also comprise an upper portion 755 and a lower portion 756. Both of upper portions 752 and 755 may be designed to support a person's head. Lower portions 753 and 756 may be designed to support a person's torso. For example, upper portions 752 and 755 may be designed to inflate to a lower pressure than lower portions 753 and 756. The lower inflation pressure may provide a softer airbag portion for contact with a person's head. In addition, upper portions 752 and 755 may be designed to have a surface material of fabric that has some softness and pliability. In contrast, lower portions 753 and 756 may be designed to have a greater inflation pressure to provide a stiffer airbag for contact with the person's torso. In addition, lower portions 753 and 756 may be designed with a surface material of woven fabric with greater stiffness (than the surface of upper portions 752 and 755) to support a person's torso.

Figure 8:
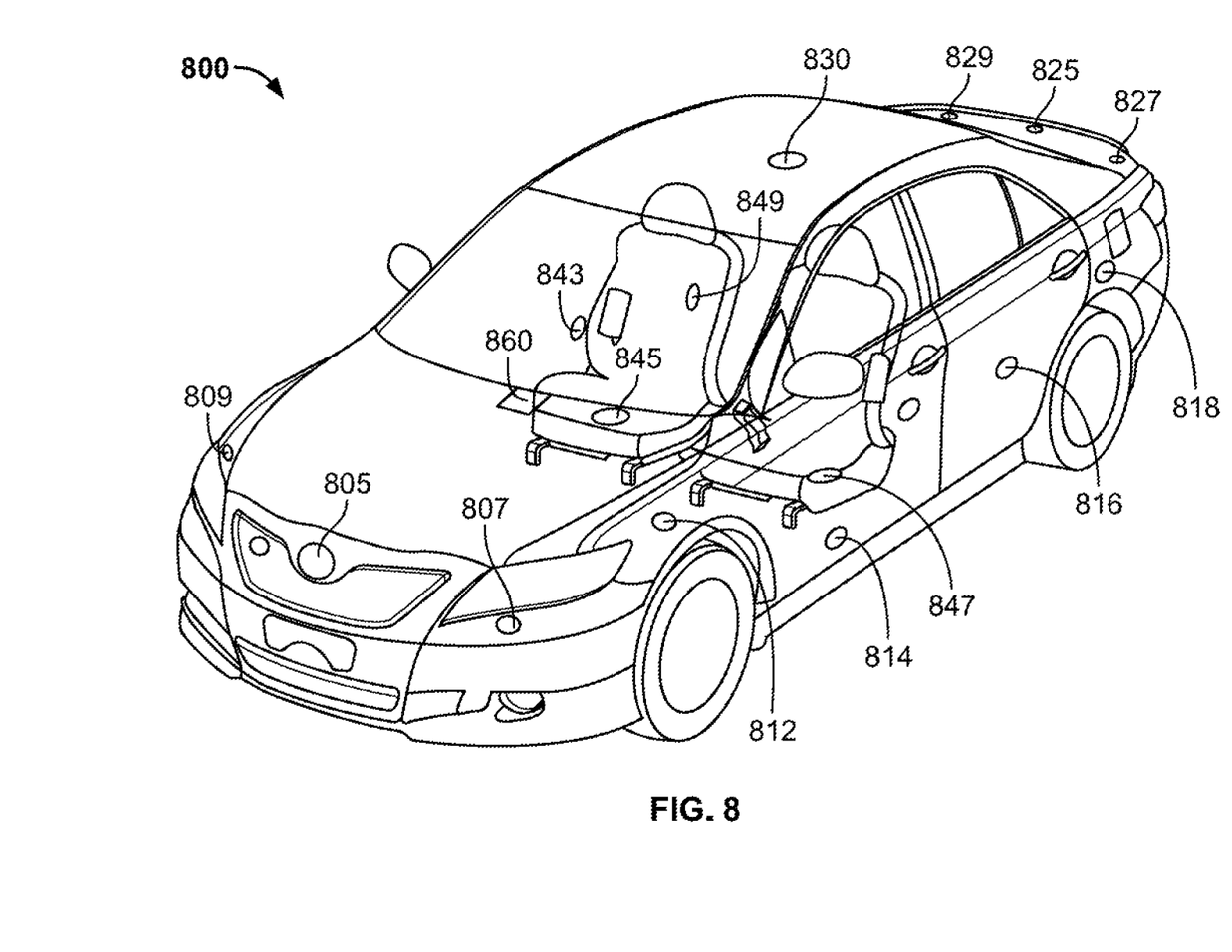
FIG. 8 shows vehicle airbag control components in accordance with some illustrative embodiments of the disclosure.

FIG. 8 depicts a representative vehicle 800 having a plurality of components to support the airbag functionality described herein. The vehicle interior and components depicted in FIG. 8 have been simplified and are illustrative of embodiments of the disclosure. There may be more or fewer vehicle sensors than are depicted, and in addition, the vehicle sensors may be located in other locations. Other details, shapes and arrangements of the vehicle interior and components may also be used with the features described herein. Vehicle crash sensors may be used to detect a crash in a vehicle. Vehicle crash sensors are typically gyroscopes and accelerometers, for example a MEMS accelerometer, which are capable of detecting deceleration of a vehicle during a crash and position of the vehicle. Vehicle crash sensors may be located in various positions in a vehicle, for example, sensor 805 may detect impacts, motion and deceleration in the front of the vehicle 800. Sensors 809 and 807 may be located in the front of vehicle 800 on a side to sense conditions of the vehicle on the front corners of vehicle 800. Sensors 812, 814, 816 and 818 may be located on a side of a vehicle, sensors 825, 827 and 829 may be located on a rear of vehicle 800, and sensor 830 may be located on top of vehicle 800. In some embodiments, each of sensors 805-830 comprises similar circuitry and capabilities for detecting crash scenarios for vehicle 800. In some embodiments, sensors 805-830 may have different capabilities that are designed for the particular location of the sensor. Vehicle 800 may also have seat sensors 843, 845, 847 and 849 which are designed to detect whether a person is sitting in a particular seat. Sensors 805-830 and seat sensors 843-849 may be in communication with a vehicle controller 860. Controller 860 may be capable of analyzing the data of sensors 805-830 and the data of seat sensors 843-849 and sending one or more signals to one or more airbags in the vehicle for activation. Depending on the information from sensors 805-830 and seat sensors 843-849, controller 860 may determine a particular crash type and vehicle occupancy and initiate deployment of a suitable airbag arrangement for the crash type. For example, in a far-side crash, a pair of airbags (e.g., any of airbag pairs 150-750) may be activated for deployment in a center of the vehicle. In another example, front airbags may be activated in the event a front side crash is detected.

Figure 9:
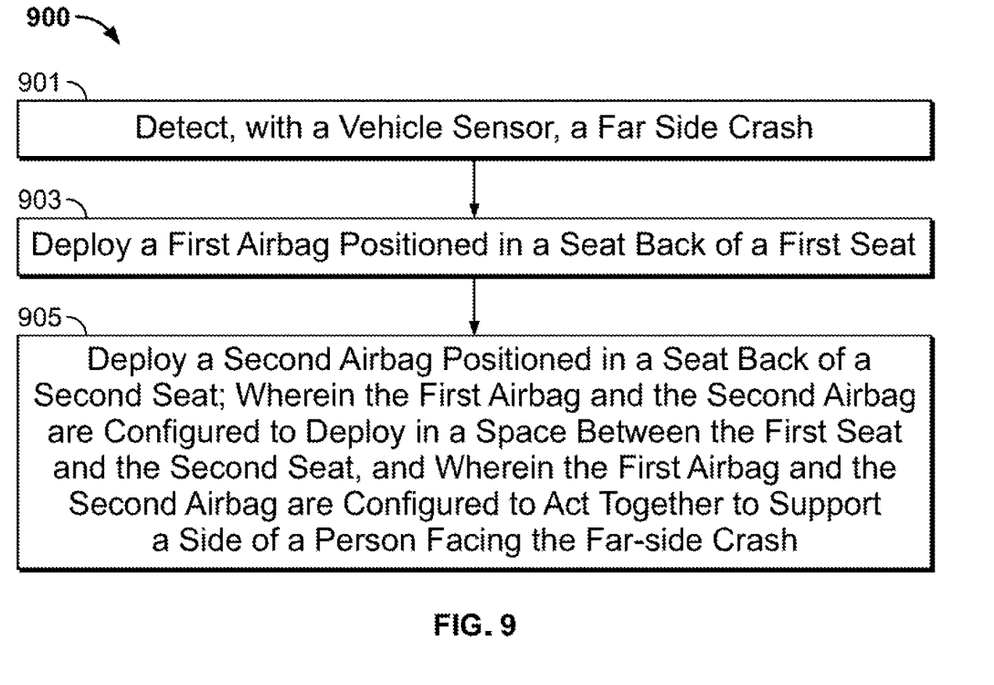
FIG. 9 depicts a flowchart of an exemplary process for protecting a person in a vehicle in a far-side crash.

FIG. 9 depicts an illustrative method 900 for protecting a person in a far-side crash. At step 901, a vehicle sensor may detect a far-side crash. The vehicle sensors may be any of sensors 805-830 that sense a vehicle condition and sensors 805-830 may communicate crash information to a controller 860 that analyzes the crash data to determine that a far-side crash has occurred. At step 903, a first airbag positioned in a seatback of a first seat is deployed. For example, when controller 860 (FIG. 8) determines that a far-side crash has happened, controller 860 may initiate, using a signal, deployment of the first airbag. The first airbag may be any of the first airbags in the pairs of airbags depicted in FIGS. 1-7. The first airbag may be positioned in a seatback of a first seat. For example, first airbag 552 (FIG. 5) may be positioned in seatback location 524 (FIG. 5).

At step 905, a second airbag positioned in a seatback of a second seat is deployed. For example, controller 860 may initiate, using a signal, deployment of the second airbag. The second airbag may be any of the second airbags in the pairs of airbags depicted in FIGS. 1-7. The second airbag may be positioned in a seatback of a first seat. For example, second airbag 554 (FIG. 5) may be positioned in seatback location 526 (FIG. 5). The two airbags may be configured to deploy in a space between the first seat and the second seat. The space between the first seat and the second seat may be as shown in the seat arrangements shown in FIGS. 1-7. The first airbag and the second airbag are configured to act together to support a side of a person facing the far-side crash.

In an example, the pair of airbags may be deployed to wedge together to support the other of the pair of airbags to form a supportive unit. For example, the first airbag and the second airbag may be deployed to wedge together between the adjacent seatbacks using a frictional force of a first surface of the first airbag and a second surface of the second airbag that is in contact with the first surface. The frictional force may be supplied by a suitable fabric for the first surface and the second surface having a selected coefficient of friction to limit slippage between the two airbags. The wedging of the first airbag and the second airbag provides reciprocal support between the first airbag and the second airbag so that together they provide a reaction surface for a vehicle occupant in the event of a far-side crash. For example, the wedging of the airbags may prevent or limit the pair of airbags from rotating when impacted by a vehicle occupant, thereby limiting the movement of the occupant towards the opposite side of the vehicle.

In some embodiments, the pair of airbags may be deployed and wedge together using a complementary shape arrangement that includes a convex shape of the first airbag at a portion of the first airbag that is in contact with a concave shape of a second portion of the second airbag. The complementary shapes may be selected to limit slippage between contact portions of the pair of airbags and thus provide a reaction surface for a vehicle occupant.

The airbags may be designed with different characteristics to protect and support different portions of a person. For example, an upper portion may be designed to support a head of the person. The upper portion of the airbag may be configured to inflate to a soft pressure so that it is soft or pliable in contact with a person's head. The upper portion of the airbag may also have a surface material selected for a softness.

A lower portion of the airbag may be designed to protect and support a torso of the person. The lower portion of the airbag may be configured to inflate to a firm pressure (greater than the inflation pressure of the upper portion) and may have a surface material selected for stiffness.

On a contact side between the airbags that does not come into contact with a person, a material may be selected that has a rigid quality that serves to support or brace the other of the airbags. The airbags may also have a material for a surface that comes into contact with a seatback that is selected with a frictional coefficient that causes the airbag to wedge with the seatback to provide additional bracing and support of the airbag pair. A seatback surface area that comes into contact with the airbags may also have a fabric that is selected to allow the wedging of the airbags.

The embodiments and examples discussed above are intended to be illustrative and not limiting. One skilled in the art would appreciate that components of the assemblies, and steps of the processes discussed herein may be omitted, modified, combined, and/or rearranged, and any additional components or steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and examples relating to one embodiment may be combined with any other embodiment in a suitable manner. It should also be noted that the systems and/or methods described above may be applied to, or used in accordance with, other systems and/or methods.

What is claimed is:

1. An airbag arrangement for protection of a person in a vehicle in a far-side crash, the airbag arrangement comprising:
    a first airbag disposed on a right side of a seatback of a first seat in the vehicle;
    a second airbag disposed on a left side of a seatback of a second seat in the vehicle, wherein:
    the second seat in the vehicle is disposed on the right side of the first seat;
    the first seat and the second seat are adjustable along a fore-aft axis of the vehicle;
    the first airbag and the second airbag are configured to deploy at least partially into space between the first seat and the second seat and act together to support a side of the person facing the far-side crash when the vehicle is involved in a far-side crash;
    the first airbag and the second airbag are configured to deploy in a first orientation when the first seat and the second seat are aligned along the fore-aft axis; and
    the first airbag and the second airbag are configured to deploy in a second turned orientation when the first seat and the second seat are misaligned along the fore-aft axis.

2. The airbag arrangement of claim 1 wherein the first airbag and the second airbag are configured to be deployed substantially concurrently.

3. The airbag arrangement of claim 1 further comprising a vehicle crash sensor configured to:
    detect a crash involving the vehicle; and
    send a signal to an airbag controller configured to control deployment of the first airbag and the second airbag when the vehicle crash sensor senses a far-side crash in the vehicle.

4. The airbag arrangement of claim 1 wherein the first airbag is configured to provide reciprocal support to the second airbag when the first airbag and the second airbag are deployed.

5. The airbag arrangement of claim 1 wherein the first airbag and the second airbag are complementary shaped pairs having a nested convex and concave shape, respectively, at a portion of the first airbag in contact with a portion of the second airbag.

6. The airbag arrangement of claim 1 wherein the first seat is configured to have an adjustable first position and the second seat is configured to have an adjustable second position, and when the first position and the second position are different along at least one axis, the first airbag and the second airbag are adapted to deploy such that one side of the first airbag facing a second side of the second airbag are substantially overlapping.

7. The airbag arrangement of claim 1 wherein the first airbag comprises a first surface having a friction coefficient selected to provide a frictional force between the first surface of the first airbag and a second surface of the second airbag in contact with the first surface, wherein when the first airbag and the second airbag are deployed, the first surface and the second surface are in contact.

8. The airbag arrangement of claim 7 wherein the frictional force is selected to provide support between the first airbag and the second airbag by the contact of the first surface and the second surface to limit slippage of the first airbag and the second airbag, the first airbag and the second airbag acting together to protect the person facing the far-side crash.

9. The airbag arrangement of claim 7 wherein the friction coefficient of the first surface is greater than a friction coefficient of an area of the first airbag surrounding the first surface.

10. The airbag arrangement of claim 7 wherein:
    the first airbag and the second airbag are each configured to be inflated by a gas when deployed, which causes the first airbag and second airbag to each expand and come together, thereby wedging the first airbag and the second airbag between the first seat and the second seat; and the frictional force reduces relative slipping movement between the first surface of the first airbag and the second surface of the second airbag when deployed.

11. The airbag arrangement of claim 1 wherein the first airbag comprises a first surface composed of a stiff material selected for rigidity to provide support to a second surface of the second airbag, the second surface in contact with the first surface, wherein when the first airbag and the second airbag are deployed, the first surface and the second surface are in contact and provide reciprocal support.

12. The airbag arrangement of claim 1 wherein the first airbag comprises:
   an upper portion comprising a woven fabric having a first stiffness; and
   a lower portion comprising a woven fabric having a second stiffness that is different than the first stiffness.

13. The airbag arrangement of claim 12 wherein the upper portion is configured to support a head of the person and the lower portion is configured to support a torso of the person.

14. The airbag arrangement of claim 12 wherein the upper portion of the first airbag is shaped to deploy in an expanded area larger than an area of the lower portion of the first airbag.

15. The airbag arrangement of claim 12 wherein:
   the upper portion of the first airbag is configured to inflate to a lower pressure than the lower portion of the first airbag;
   when the upper portion is inflated, the upper portion has a soft surface to protect a head of the person; and
   when the lower portion is inflated, the second lower portion has a firm surface to protect a torso of the person.

16. The airbag arrangement of claim 1 wherein the first airbag and the second airbag are configured to deploy to exert, as a pair, a reaction force against the person.

17. A method of arranging a pair of airbags for protection of a person in a vehicle in a far-side crash, the method comprising:
   detecting, with a sensor in the vehicle, that a far-side crash has occurred;
   deploying a first airbag positioned in a seatback of a first seat; and
   deploying a second airbag positioned in a seatback of a second seat, wherein:
      the second seat is disposed on the right side of the first seat;
      the first seat and the second seat are adjustable along a fore-aft axis of the vehicle:
      the first airbag and the second airbag are configured to deploy in a space between the first seat and the second seat and act together to support a side of the person facing the far-side crash;
      the first airbag and the second airbag are configured to deploy in a first orientation when the first seat and the second seat are aligned along the fore-aft axis; and
      the first airbag and the second airbag are configured to deploy in a second turned orientation when the first seat and the second seat are misaligned along the fore-aft axis.

18. The method of claim 17 wherein deploying the second airbag further comprises wedging the first airbag and the second airbag upon deployment using a frictional force of a first surface of the first airbag and a second surface of the second airbag in contact with the first surface, the wedging of the first airbag and the second airbag providing reciprocal support and controlling slippage between the first airbag and the second airbag.

19. The method of claim 17 wherein deploying the second airbag further comprises wedging the first airbag and the second airbag upon deployment using a complementary shape arrangement comprising a convex shape of the first airbag at a portion of the first airbag in contact with a concave shape of a second portion of the second airbag to controlling slippage between the first airbag and the second airbag.

20. The method of claim 17 further comprising:
   supporting a head of the person using an upper portion of the first airbag, the upper portion of the first airbag configured to inflate to a soft pressure, and the upper portion of the first airbag having a surface material selected for a softness; and
   supporting a torso of the person using a lower portion of the first airbag, the lower portion of the first airbag configured to inflate to a firm pressure greater than the inflation pressure of the upper portion of the first airbag, and the lower portion of the first airbag having a surface material selected for stiffness.

* * * * *